United States Patent
Schreder et al.

(10) Patent No.: US 9,018,116 B2
(45) Date of Patent: Apr. 28, 2015

(54) OPTICAL GLASS

(71) Applicant: Schott AG, Mainz (DE)

(72) Inventors: Bianca Schreder, Sulzbach (DE); Karl Mennemann, Taunusstein (DE); Ute Woelfel, Mainz-Laubenheim (DE); Volker Dietrich, Heidesheim (DE)

(73) Assignee: Schott AG, Mainz (DE)

( * ) Notice: Subject to any disclaimer, the term of this patent is extended or adjusted under 35 U.S.C. 154(b) by 63 days.

(21) Appl. No.: 13/911,580

(22) Filed: Jun. 6, 2013

(65) Prior Publication Data

US 2013/0331255 A1    Dec. 12, 2013

(51) Int. Cl.
*C03C 3/068*    (2006.01)

(52) U.S. Cl.
CPC ...................................... *C03C 3/068* (2013.01)

(58) Field of Classification Search
CPC ....................................................... C03C 3/068
USPC .......................................................... 501/78
See application file for complete search history.

(56) References Cited

U.S. PATENT DOCUMENTS

| | | | |
|---|---|---|---|
| 4,268,312 A | | 5/1981 | Ishibashi |
| 4,439,531 A | * | 3/1984 | Mennemann et al. ........... 501/75 |
| 4,584,279 A | * | 4/1986 | Grabowski et al. ............. 501/78 |

FOREIGN PATENT DOCUMENTS

| | | |
|---|---|---|
| CN | 101289276 | 10/2008 |
| DE | 2756161 | 12/1977 |
| DE | 2942038 | 5/1980 |
| DE | 3130039 | 3/1983 |
| DE | 10227494 | 12/2003 |
| DE | 12036136 | 2/2004 |
| DE | 102009047511 | 6/2011 |
| EP | 1206418 | 5/2002 |
| EP | 1432654 | 6/2004 |
| EP | 1433757 | 6/2004 |
| JP | 2011246337 | 12/2011 |

* cited by examiner

*Primary Examiner* — Karl Group
(74) *Attorney, Agent, or Firm* — Ohlandt, Greeley, Ruggiero & Perle, LLP

(57) ABSTRACT

A highly refractive and highly transparent optical glass is provided. The use of such a glass, optical elements and processes for producing the glass or the optical elements are also provided.

8 Claims, 1 Drawing Sheet

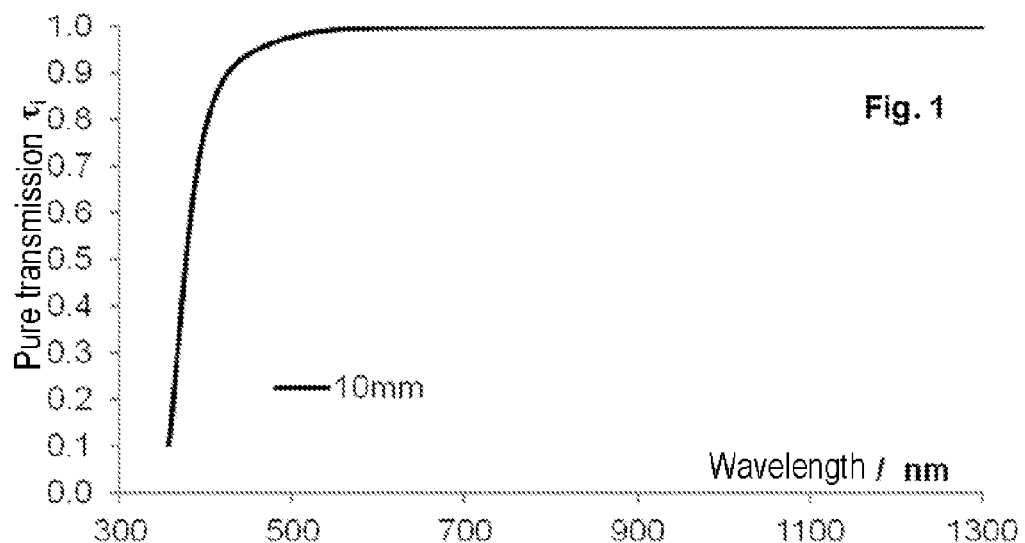
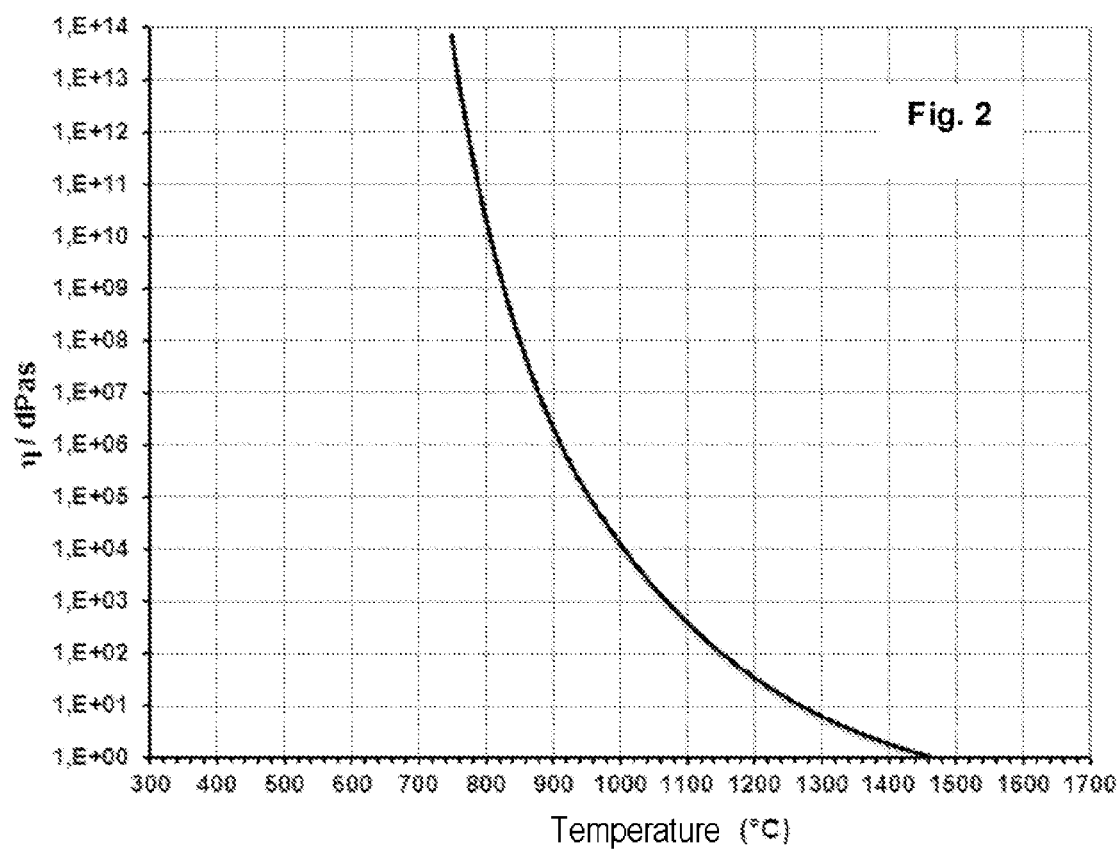

OPTICAL GLASS

CROSS REFERENCE TO RELATED APPLICATIONS

This application claims benefit under 35 U.S.C. §119(a) of German Patent Application No. 10 2012 209 531.4, filed Jun. 6, 2012, the entire contents of which are incorporated herein by reference.

BACKGROUND OF THE INVENTION

1. Field of the Invention

The present invention relates to a highly refractive and highly transparent optical glass, the use of such a glass, optical elements and processes for producing the glass or the optical elements.

2. Description of Related Art

In recent years, the market trend both in optical technologies and optoelectronic technologies (fields of application of imaging, projection, telecommunication, optical news technology, mobile drive and laser technology) is increasingly in the direction of miniaturisation. This can be seen from the end products which are becoming ever smaller and requires increasing miniaturisation of the individual components and constituents of such end products. For this reason, ever more refractive glasses, i.e. glasses having a greater refractive index or index of refraction, are required. Highly refractive glasses make it possible to shorten the component or lens size by shortening the focal length of a lens element. Furthermore, small radii of curvature of the lens elements are possible, which leads to simpler production less prone to errors.

At the same time, these highly refractive glasses should have low dispersion, i.e., high Abbe numbers. A large or high Abbe number makes correction of the chromatic error in a lens system (colour deviation) possible. Glasses having high refractive indices normally have small Abbe numbers, i.e. they display relatively high dispersions.

In addition, ever more demanding quality requirements make very high internal transmissions (German "Reintransmission") of the material necessary and it is desirable for the glasses not only to have the required optical properties but also be sufficiently chemically resistant and have very low coefficients of expansion.

Glasses having similar optical positions, i.e. the position in the Abbe diagram or chemical compositions have already been described in the prior art, but these glasses have considerable disadvantages.

Unfavourable compositions of rare earth metal oxides, $WO_3$, $TiO_2$, $Ta_2O_5$ and/or $Nb_2O_5$ can lead to either the optical position not being attained or else the high transmission requirements not being fulfilled. Highly refractive glasses normally display, due to the use of polarisable ions such as $Bi^{3+}$ or the use of ions having absorption bands in or near the visible region (e.g. PbO, $WO_3$ (DE 2942038) and/or $TiO_2$), a distinct yellowish colour which is caused by shifting of the band edge to longer wavelengths, or a deterioration in the internal transmission especially in the UV region. According to the prior art, such a deterioration in the internal transmission can be avoided by, for example, using less strongly polarisable cations and ensuring that absorbing components are not used or used only in very small proportions.

In the case of high-transmission glasses, $TiO_2$ has hitherto been avoided as glass component because $TiO_2$ can, in addition to the absorption band in the near UV region, lose oxygen at high temperatures. As a result of such loss of oxygen reduced, coloured ions can be formed, and $TiO_2$ can also form a brownish iron-titanate complex with iron impurities. Glasses having a very high $TiO_2$ content are described in CN 101289276 A.

In addition, the combination of $TiO_2$ with $Nb_2O_5$ is very challenging in process engineering terms since Nb also gives off oxygen at high temperatures and then later competes with $TiO_2$ for the free oxygen still dissolved in the glass. If the process is not controlled precisely, brown-coloured glasses are formed. $Nb_2O_5$ and $WO_3$, in particular, are known for shifting the UV edge of glasses significantly into the visible region.

The glasses known from the prior art, as described, for example, in DE 10 2009 047 511, also suffer from problems in production and due to the cost of the mix caused by the use of relatively high proportions of extremely expensive raw materials $Ta_2O_5$, $WO_3$ and $GeO_2$. Owing to the high density of the glasses of the prior art and the small processing range in combination with a very steep viscosity curve, striae (German "Schlieren"), in particular volume striae, can be formed in production and are disadvantageous in further processing to produce optical elements.

Highly refractive optical glasses in this position range frequently belong to the lanthanum borate glass system. This is known for its steep viscosity curves, its tendency for severe surface and interface crystallisation to occur and for the attack on refractory materials, in particular $SiO_2$ (by the $B_2O_3$ components). Dissolution of $SiO_2$ in the glass can likewise lead to severe striae and also a decrease in the refractive index of the glass and thus to known problems, so that this glass system usually has to be melted in noble metal crucibles such as Pt or Pt/Ir crucibles to avoid this effect. On the other hand, due to introduction of particles or dissolved Pt, Pt leads to shifting of the absorption edge into the visible and to an increased crystallisation tendency (in the case of particles), in particular during repressing of the glasses.

In many cases, a high content of network formers such as $B_2O_3$ (DE 2756161A, DE 10227494A, JP 2011-246337A) and $SiO_2$ leads to a decrease in the achievable refractive index $n_d$. Furthermore, at particular combinations of the rare earth metal oxides and the classical network formers, either the desired combination of transmission and optical position cannot be achieved or the glass system has an even stronger tendency to crystallize, which results in an unacceptably high reduction in yield and the glasses cannot be produced economically. For these reasons, it was hitherto assumed in the prior art that the borate content always has to be greater than the $SiO_2$ content (EP 1433757 A by Hoya) or alternatively the glass must not contain any $SiO_2$.

SUMMARY OF THE INVENTION

It is an object of the present invention to provide an optical glass which has the desired, advantageous optical properties (optical position with $n_d$ and $v_d$ and internal transmission $\tau_i$). These glasses should be suitable for the fields of application of imaging, projection, telecommunications, optical news technology, mobile drive and laser technology. They should also be easy to melt and to process and have a satisfactory crystallisation stability which makes manufacture in continuously operated apparatuses possible. Furthermore, the optical glass should couple with an alternating electromagnetic field, in particular a high-frequency (HF) field, in order to be able to introduce large quantities of energy into a melt by induction. The boundary condition for this is a good specific electrical conductivity of the glass over a temperature range which makes an optimal melt possible.

Direct inductive heating of the melt by means of a high-frequency alternating field makes it possible to produce particularly pure glasses since there is no direct contact of the melt with the material of a heating device.

According to a first aspect, the present invention relates to an optical glass which contains $La_2O_3$, $SiO_2$, $B_2O_3$, $TiO_2$ and $Ta_2O_5$ and in which the $B_2O_3/SiO_2$ ratio of the proportions by weight is less than 1, preferably not more than 0.95, more preferably not more than 0.90 and most preferably not more than 0.80, and which comprises the following composition (in % by weight on an oxide basis) is provided:

| | |
|---|---|
| $La_2O_3$ | 40.0-60.0 |
| $SiO_2$ | 5.0-18.0 |
| $B_2O_3$ | 4.0-<10.0 |
| $TiO_2$ | 0.1-10.0 |
| $Ta_2O_5$ | 0.1-10.0 |
| $ZrO_2$ | 0-15.0 |
| $Nb_2O_5$ | 0-15.0 |
| $Y_2O_3$ | 0.1-5.0 |
| $Gd_2O_3$ | 0-15.0 |

According to a second aspect, the present invention further provides for a method of using of the glasses of the invention for the fields of application of imaging, projection, telecommunications, optical news technology, mobile drive and laser technology.

According to a third aspect, the invention further provides optical elements pressed from the glasses described, for example produced by repressing, and a process for producing optical elements by repressing of the glasses described.

According to a fourth aspect, the present invention further provides optical elements which comprise the glass of the invention. Optical elements can be, in particular, lenses, aspherical bodies, prisms and compact components. For the purposes of the invention, the term "optical element" encompasses intermediates or preforms of such an optical element, for example spheres, gobs and the like.

According to a sixth aspect, the present invention also provides a process for producing glasses according to the invention, which comprises the step of direct inductive heating of the above-described glass composition by means of a high-frequency alternating electromagnetic field.

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

DESCRIPTION OF THE DRAWINGS

FIG. 1 shows the internal transmission curve of a glass according to the invention as per Example 1.

FIG. 2 shows the viscosity-temperature curve of a glass according to the invention as per Example 1. The temperature-viscosity curve could be flattened to such an extent that a better processing range can be set and volume striae could be avoided as a result of the comparatively higher casting viscosity.

DETAILED DESCRIPTION

According to a first aspect, the present invention relates to an optical glass which contains $La_2O_3$, $SiO_2$, $B_2O_3$, $TiO_2$ and $Ta_2O_5$ and in which the $B_2O_3/SiO_2$ ratio of the proportions by weight is less than 1, preferably not more than 0.95, more preferably not more than 0.90 and most preferably not more than 0.80, and which comprises the following composition (in % by weight on an oxide basis) is provided:

| | |
|---|---|
| $La_2O_3$ | 40.0-60.0 |
| $SiO_2$ | 5.0-18.0 |
| $B_2O_3$ | 4.0-<10.0 |
| $TiO_2$ | 0.1-10.0 |
| $Ta_2O_5$ | 0.1-10.0 |
| $ZrO_2$ | 0-15.0 |
| $Nb_2O_5$ | 0-15.0 |
| $Y_2O_3$ | 0.1-5.0 |
| $Gd_2O_3$ | 0-15.0 |

A composition range which has a low $Ta_2O_5$ content and displays the desired transmission and optical position and also improved process properties compared to the glasses of the prior art has surprisingly been found.

The glasses are in an extreme peripheral position in the Abbe diagram and preferably have a refractive index $n_d$ of at least 1.90, preferably at least 1.92, and/or not more than 2.10, preferably not more than 2.05, and according to one embodiment preferably not more than 1.97. The glasses have, in one embodiment, an Abbe number $v_d$ of not more than 39, preferably not more than 38, more preferably not more than 35, and/or an Abbe number $v_d$ of at least 28, more preferable at least 30, most preferably at least 31.

The glasses of the invention surprisingly have an excellent internal transmission in the blue and UV region of the spectrum, as a result of which the colour error can be reduced and a better signal-to-noise ratio can be achieved.

Likewise surprisingly, the same refractive index position could be achieved at an at least 10% lower density, which leads to a reduction in weight and thus, for example, to longer battery life and faster control or reaction of the AF/antivibration motors in cameras. The glass preferably has a density of not more than 5.5 g/cm$^3$, more preferably not more than 5.4 g/cm$^3$. The density of the glass is preferably as low as for a glass having the preferred optical position, for example at least 4.4 g/cm$^3$.

Furthermore, compared to glasses known from the prior art, the glass has a low abrasion A (according to Yogis 10-1994) of preferably not more than 55, more preferably not more than 50 and/or preferably at least 30, more preferably at least 40. As a result, the glass can be processed more quickly but nevertheless has sufficient hardness and thus scratch resistance. $GeO_2$, $P_2O_5$ and alkali metal oxides, for example, are usually used to give the glass a lower hardness. It is surprising that in the case of the glass of the invention, an abrasion in the range indicated was able to be achieved without addition of these components.

A "short" glass is generally understood to be a glass which has a very steep viscosity curve in the viscosity range from, in particular, $10^2$ to $10^{13}$ dPas, i.e. its viscosity in this viscosity range also changes greatly when the temperature undergoes a relatively small change. Although short glasses are desirable for some processing steps, processing problems occur in the case of extremely short glasses. The glass of the invention has the advantage that it is somewhat "longer" than comparable glasses of the prior art in two critical temperature ranges: firstly in the range between refining and melting (viscosity range from $10^{0.1}$ to $10^2$ dPas) and secondly in the range from $10^2$ to $10^{13}$ dPas. This makes it easier to process the glass and produce it without striae; in particular, the formation of a "central streak" during casting is not observed. The width of the temperature interval ΔT in which the viscosity of this glass decreases from $10^2$ to $10^{13}$ dPas is preferably from 370 to 450 K.

For the purposes of the invention, the "internal quality" of a glass means that the glass contains a very small proportion of bubbles and/or striae and/or similar defects or is preferably free of these. In one embodiment, the glass of the invention contains no volume striae discernible by the shadow method at least in one direction, preferably in two mutually perpendicular directions. In the shadow method, a glass specimen is held either between a light source and the eye of the observer and the shadow-casting striae are discerned by moving and tilting the glass specimen (see MIL-G-174A and similar standards), or light is shone through the glass specimen and the striae present in the glass specimen are projected as shadows on to a projection screen (see ISO 10110-4). Furthermore, the glass preferably has the bubble class B1, more preferably B0, in accordance with ISO 10110-3.

In the following, the expression "X-free" or "free of a component X" means, unless indicated otherwise, that the glass essentially does not contain this component X, i.e. that such a component is present at most as impurity in the glass but is not added as individual component to the glass composition. X may be any component, for example F or $Li_2O$.

In the following, all proportions of the glass components are given in % by weight and on an oxide basis, unless indicated otherwise.

The base glass system of the glass of the invention is a lanthanum borosilicate which has a good basis for the desired properties.

The glass of the invention contains lanthanum oxide in a proportion of from 40 to 60% by weight. The proportion should not go below the lower limit because otherwise the high refractive index in combination with the high Abbe number cannot be realized. The upper limit should not be exceeded since otherwise the viscosity of the glass is increased too greatly and, in addition, the devitrification tendency increases. The glass preferably contains at least 42.0% by weight, more preferably at least 44.0% by weight, of $La_2O_3$. The proportion of $La_2O_3$ is preferably not more than 54.0% by weight, more preferably not more than 52.0% by weight.

As further constituent, the glass contains $B_2O_3$ as network former in a proportion of from ≥4 to <10% by weight. If the maximum limit is exceeded, a high refractive index is no longer possible. However, the proportion should also not go below the indicated lower limit since the strongly network-forming properties of $B_2O_3$ increase the stability of the glasses to crystallization and increase the chemical resistance. In addition, the meltability of the glasses is achieved in this way. The proportion of $B_2O_3$ is preferably at least 4.5% by weight, more preferably at least 5.0% by weight. The proportion of $B_2O_3$ is preferably limited to not more than 9.0% by weight, more preferably not more than 8.0% by weight.

Furthermore, the glass contains $SiO_2$ in a proportion of from 5.0 to 18.0% by weight. The glass preferably contains at least 5.5% by weight, more preferably at least 7.0% by weight, of $SiO_2$. The proportion of $SiO_2$ is preferably limited to not more than 16% by weight, more preferably not more than 14% by weight.

According to the invention, it is important that the proportion of $SiO_2$ is greater than the proportion of $B_2O_3$, i.e. the ratio (proportion in % by weight of $B_2O_3$)/(proportion in % by weight of $SiO_2$) is less than 1. This ratio is preferably not more than 0.95, more preferably not more than 0.90, even more preferably not more than 0.85 and most preferably not more than 0.80. The ratio is preferably at least 0.50. Without wishing to be tied to a theory, it is presumed that this ratio contributes to the good properties of the glass, in particular the somewhat greater length and the lower density of the glass.

The total content of the oxides $B_2O_3$ and $SiO_2$ ($B_2O_3$+$SiO_2$) is preferably not more than 20% by weight, particularly preferably not more than 18% by weight. The addition of both components is preferred so that no demixing of the glass occurs. Furthermore, the total content of the oxides $B_2O_3$ and $SiO_2$ is preferably at least 5% by weight, more preferably at least 10% by weight.

The glass additionally contains $TiO_2$ in a proportion of from 0.1 to 10% by weight. It has surprisingly been found that despite the addition of $TiO_2$, no deterioration in the transmission in the UV region occurs. The glass preferably contains at least 2.0% by weight, more preferably at least 3.5% by weight, of $TiO_2$. However, the proportion should preferably be limited to less than 8.0% by weight, more preferably not more than 6.5% by weight.

The glass additionally contains $Ta_2O_5$ in a proportion of from 0.1 to 10% by weight. The proportion of $Ta_2O_5$ is preferably at least 1.0% by weight, more preferably at least 2.0% by weight. The content should not go below the minimum proportion in order to ensure the higher refractive index and give the glass stability to devitrification. However, the proportion of $Ta_2O_5$ is preferably limited to not more than 8.0% by weight, more preferably not more than 7.0% by weight, since this component is an expensive glass constituent. Within the limits indicated for this glass according to the invention, $Ta_2O_5$ ensures the combination of high refractive index and high Abbe number.

The glass preferably contains not more than 5% by weight, more preferably less than 0.5% by weight, of $WO_3$. The glass can contain at least 0.05% by weight of $WO_3$. In one embodiment, the glass is free of $WO_3$.

In conventional glasses, the glass components $Ta_2O_5$ and $WO_3$ contribute greatly to the combination of high refractive index and high Abbe number. Surprisingly, a composition range which covers the desired optical position and displays a high internal transmission in the blue and UV region of the spectrum has been able to be found despite a significant reduction in the $Ta_2O_5$ content and even without the addition of $WO_3$.

As further components to adjust the glass properties, in particular the optical position, $ZrO_2$, $Nb_2O_5$, $Gd_2O_3$ and/or $Y_2O_3$ can be present in the glass.

$ZrO_2$ is preferably present in a proportion of at least 0.1% by weight, more preferably 1% by weight, even more preferably at least 4.0% by weight, most preferably in a proportion of at least 6.0% by weight. The glass contains not more than 15.0% by weight, preferably not more than 10.0% by weight, more preferably not more than 9.5% by weight, of $ZrO_2$.

$Nb_2O_5$ promotes a high refractive index but also leads to a lower Abbe number and can bring about a deterioration in the internal transmission. This component is preferably present in a proportion of at least 0.1% by weight, more preferably at least 3.0% by weight, most preferably in a proportion of at least 7.5% by weight. The glass should contain not more than 15.0% by weight, preferably not more than 11.0% by weight, more preferably not more than 10.0% by weight, of $Nb_2O_5$.

Surprisingly, it has been possible to find a composition range in which $Nb_2O_5$ and $TiO_2$ do not have a transmission-reducing effect on the internal transmission. According to the invention, the ratio of (total proportion in % by weight of $TiO_2$+$ZrO_2$)/(total proportion in % by weight of $Gd_2O_3$+$Nb_2O_5$+$Y_2O_3$) is preferably at least 0.4, more preferably at least 0.5, even more preferably at least 0.6 and in one embodiment at least 0.65. This ratio is preferably not more than 1.0, more preferably not more than 0.9 and in one embodiment not more than 0.85.

The proportion of $Gd_2O_3$ is not more than 15% by weight and preferably at least 0.1% by weight, more preferably at least 1.0% by weight, even more preferably at least 5.0% by weight, most preferably at least 6.0% by weight. However, the proportion of $Gd_2O_3$ is preferably limited to not more than 10.0% by weight, more preferably not more than 9.0% by weight, since this component is an expensive glass constituent. The upper limit should not be exceeded because $Gd_2O_3$ as rare earth metal oxide can, with a weak band around 590 nm, cause a deterioration in the internal transmission.

The glass contains not more than 5.0% by weight of $Y_2O_3$, preferably not more than 3.0, more preferably not more than 1.5% by weight and most preferably not more than 1.0% by weight. The glass preferably contains at least 0.1% by weight of $Y_2O_3$. $Y_2O_3$ in small proportions also surprisingly contributes to the desired combination of high refractive index and high Abbe number.

In one embodiment, the sum of the proportions by weight of the components $La_2O_3$, $Ta_2O_5$, $Gd_2O_3$, $Nb_2O_5$ and $Y_2O_3$ is at least 50% by weight, particularly preferably at least 55% by weight, more preferably at least 60% by weight and particularly preferably at least 65% by weight. This sum ensures the high refractive index in combination with the high Abbe number of the glass of the invention.

$HfO_2$ can be present in the glass in a proportion of at least 0.01% by weight, preferably at least 0.03% by weight, particularly preferably at least 0.04% by weight, and/or not more than 1% by weight, preferably not more than 0.50% by weight in the glass, particularly preferably not more than 0.25% by weight. This component can be added to adjust the refractive index and the Abbe number and together with further components stabilizes the glass to such an extent that the glass does not demix in a further heating process, e.g. repressing.

The glass can additionally contain $Ga_2O_3$, $P_2O_5$, $GeO_2$ and/or $Al_2O_3$, preferably in a proportion of in each case at least 0.01% by weight and/or in each case not more than 5.0% by weight, preferably in each case not more than 2.0% by weight, most preferably in each case not more than 1.0% by weight. The total content of $Al_2O_3+P_2O_5+Ga_2O_3+GeO_2$ is preferably not more than 10% by weight, more preferably not more than 5% by weight. In one embodiment, the glass is free of $Al_2O_3$, $P_2O_5$, $GeO_2$ and/or $Ga_2O_3$. The addition of $GeO_2$ is not preferred since this component is an expensive glass component.

In a particularly preferred embodiment, the glass is free of alkali metal oxides $R_2O$, i.e. $Li_2O$, $Na_2O$, $K_2O$, $Rb_2O$, $Cs_2O$. Alkali metal oxides can reduce the refractive index of the glass too greatly. In addition, they tend to evaporate in the melt and lead to inhomogeneity. Furthermore, they are cations having a small molar mass which can put the melt stability of the glass of the invention in production at risk.

To regulate the viscosity-temperature behaviour flexibly, the glass of the invention may optionally contain one or more alkaline earth metal oxides RO, e.g. MgO, CaO, BaO and/or SrO, and/or ZnO. The sum of alkaline earth metal oxides and ZnO in the glass of the invention is preferably from 0 to 3.0% by weight. The addition of alkaline earth metal oxides or ZnO can serve to optimize the devitrification behaviour of the glass. In one embodiment, the glass is free of alkaline earth metal oxides.

In one embodiment of the present invention, the total content of $R_2O+RO$ (where RO denotes alkaline earth metal oxides and ZnO) is less than 5% by weight, preferably not more than 4% by weight.

The glass of the invention can comprise conventional refining agents in small amounts. The sum of the refining agents added is preferably not more than 1.0% by weight, more preferably not more than 0.5% by weight. At least one of the following components can be present as refining agent in the glass of the invention (in % by weight):

| | | |
|---|---|---|
| $Sb_2O_3$ | 0-1 | and/or |
| $As_2O_3$ | 0-1 | and/or |
| SnO | 0-1 | and/or |
| NaCl | 0-1 | and/or |
| $SO_4^{2-}$ | 0-1 | and/or |
| $F^-$ | 0-1 | and/or |
| Inorganic peroxides | 0-1 | |

As inorganic peroxides, it is possible to use, for example, zinc peroxide, lithium peroxide and/or alkaline earth metal peroxides.

In one embodiment of the present invention, the glass of the invention preferably comprises at least 90% by weight, more preferably at least 95% by weight, most preferably 99% by weight, of the abovementioned components.

In one embodiment, the glass comprises 90% by weight, preferably 95% by weight, more preferably 98% by weight, of the components $La_2O_3$, $SiO_2$, $B_2O_3$, $TiO_2$, $Ta_2O_5$, $ZrO_2$, $HfO_2$, $Nb_2O_5$, $Y_2O_3$ and $Gd_2O_3$.

In one embodiment of the present invention, the glass of the invention is also preferably free of other components not mentioned in the claims or the description, i.e. in such an embodiment the glass consists essentially of the abovementioned components, with individual components which are not mentioned or mentioned as less preferred being able to be left out. The expression "consist essentially of" means that other components are present at most as impurities but are not deliberately added as individual components to the glass composition.

The glass of the invention is, as optical glass, preferably free of colour-imparting components, e.g. oxides of V, Cr, Mn, Fe, Co, Ni and/or Cu, and/or optically active components such as laser-active components, e.g. oxides of Pr, Nd, Sm, Eu, Tb, Dy, Ho, Er and/or Tm. In addition, the glass is preferably free of components which are considered to be hazardous to health or ecologically problematical, e.g. oxides of As, Pb, Cd, Tl and Se.

Fluorine and fluorine-containing compounds tend to vaporize during the melting and fusion process and thus make precise setting of the glass composition difficult. The glass of the invention is therefore preferably also fluorine-free.

In particular, the glass of the invention is preferably also free of components which are redox-sensitive, for example $Ag_2O$ or $Bi_2O_3$. "Redox-sensitive" components easily change the valences in the melt at the melting temperatures, so that undesirable discoloration can occur. Thus, $Ag_2O$ can easily be reduced to the element, which can lead not only to a yellow coloration, i.e. shifting of the UV edge into the longer-wavelength region, but also to scattering at elemental metal particles ($Bi^0$, $Ag^0$) present in the glass.

The glass of the invention preferably contains platinum as platinum ions or platinum particles in an amount of less than 6 ppm, preferably less than 5 ppm. In this way, absorption of UV by Pt is largely avoided and a high internal transmission of the glass at 410 nm (measured at a path length of 10 mm) of greater than or equal to 80% is also not prevented by this impurity.

The glasses of the invention satisfy the requirements of a low coefficient of expansion (measured for the temperature range from 20 to 300° C.) $\alpha_{20-300}$. $\alpha_{20-300}$ is preferably not more than $11\times10^{-6}$/K, more preferably not more than $10\times10^{-6}$/K and in one embodiment not more than $9\times10^{-6}$/K. This avoids problems caused by thermal stresses during further processing and joining technology.

At a specimen thickness of 10 mm, the glass of the invention preferably has an internal transmission $\tau r_{ip}$ at 600 nm and/or 700 nm of at least 95%, more preferably at least 98%. In particular, the glass also has, at a specimen thickness of 10 mm, an internal transmission $\tau_{ip}$ at 410 nm of at least 75%, more preferably at least 80%, even more preferably at least 82%.

The colour code (CC) FC(70/5) should preferably be not more than 43/37 (or 43/38).

The glass of the invention has a good chemical resistance. In particular, it can have an acid resistance SR below class 3 in accordance with ISO 8424 and/or an alkaline resistance below 2 in accordance with ISO 10629. It is assumed that the good chemical resistance is brought about by the absence of alkaline metal oxides and the low boron oxide content.

In addition, the combination of crystallisation stability and viscosity-temperature profile of the glasses of the invention makes virtually problem-free thermal (further) treatment (in particular repressing or other further processing steps in a viscosity range from $10^3$ to $10^5$ dPas) of the glasses possible. The crystallization stability cannot be attributed to individual glass components. It is assumed that the combination of many different components improves the crystallization stability in a surprising way.

The present invention further provides for the use of the glasses of the invention for the fields of application of imaging, projection, telecommunications, optical news technology, mobile drive and laser technology.

The invention further provides optical elements pressed from the glasses described, for example produced by repressing, and a process for producing optical elements by repressing of the glasses described.

The present invention further provides optical elements which comprise the glass of the invention. Optical elements can be, in particular, lenses, aspherical bodies, prisms and compact components. For the purposes of the invention, the term "optical element" encompasses intermediates or preforms of such an optical element, for example spheres, gobs and the like.

The present invention also provides a process for producing glasses according to the invention, which comprises the step of direct inductive heating of the above-described glass composition by means of a high-frequency alternating electromagnetic field.

The process preferably further comprises the step: placing of glass fragments or a mix of the above-described compositions in a skull crucible.

Such a "skull crucible" for the melting operation for the mix is described, for example, in EP 1 206 418, DE 102 36 136 and EP 1 432 654. The crucible is preferably made of aluminium. A skull crucible makes it possible to carry out melting in the same material, so that a particularly pure glass can be obtained. The mix can be melted either batchwise or continuously in the apparatus.

The process preferably further comprises the steps: liquefaction of part of the mix or the glass fragments by means of a burner, and coupling in of a high-frequency (HF) field into the premelted melt material, so that the remaining mix or the fragments are melted by the introduction of heat.

The further processing can either be carried out conventionally (in platinum) or in the case of particularly aggressive glasses in a second HF apparatus which is used for refining. An HF refining process is described in EP 1 206 418.

This is followed by continuous or batchwise working-up of the glass.

The entire disclosures of all applications, patents and publications, cited above and below, and of corresponding German application DE102012209531 filed Jun. 6, 2012, are hereby incorporated by reference.

The present invention will be illustrated below by a series of examples. However, the present invention is not limited to the examples mentioned.

EXAMPLES

The raw materials for the oxides are weighed out, one or more refining agents are added and the mixture is subsequently mixed well. The glass mix is melted and refined (at from 1400 to 1550° C.) in a skull crucible in a batch or continuous high-frequency melting apparatus. At a casting temperature of less than or equal to 1380° C., the glass can be poured and processed to give the desired dimensions.

Further examples according to the invention are shown in Tables 1 through 3.

TABLE 1

Examples 1 to 5

|  | Ex. 1 | Ex. 2 | Ex. 3 | Ex. 4 | Ex. 5 |
|---|---|---|---|---|---|
| $La_2O_3$ | 49.6 | 45.0 | 52.0 | 50.5 | 47.2 |
| $SiO_2$ | 9.3 | 8.5 | 10.2 | 12.1 | 7.2 |
| $B_2O_3$ | 6.7 | 7.0 | 5.0 | 7.0 | 4.5 |
| $Ta_2O_5$ | 5.2 | 6.0 | 5.5 | 9.1 | 4.0 |
| $TiO_2$ | 5.2 | 9.2 | 3.4 | 6.0 | 5.8 |
| $ZrO_2$ | 7.2 | 8.5 | 6.0 | 9.0 | 10.0 |
| $Nb_2O_5$ | 8.7 | 9.3 | 11.5 | 5.2 | 11.0 |
| $Y_2O_3$ | 0.4 | 0.0 | 1.0 | 1.1 | 2.0 |
| $Gd_2O_3$ | 7.5 | 6.5 | 5.4 | 0.0 | 8.3 |
| $Hf_2O$ | 0.2 | 0.0 | 0.0 | 0.0 | 0.0 |
| Total | 100.0 | 100.0 | 100.0 | 100.0 | 100.0 |
| $n_d$ | 1.95 | 1.96 | 1.95 | 1.92 | 1.96 |
| $\upsilon_d$ | 33 | 29 | 33 | 34 | 31 |
| Density | 5.23 | 5.06 | 5.26 | 5.12 | 5.21 |
| Tg | 746 | 733 | 736 | 737 | 730 |

TABLE 2

Examples 6 to 10

|  | Ex. 6 | Ex. 7 | Ex. 8 | Ex. 9 | Ex. 10 |
|---|---|---|---|---|---|
| $La_2O_3$ | 42.0 | 54.0 | 49.0 | 51.3 | 53.5 |
| $SiO_2$ | 6.9 | 15.8 | 7.5 | 11.5 | 5.5 |
| $B_2O_3$ | 6.0 | 9.9 | 4.4 | 5.6 | 4.5 |
| $Ta_2O_5$ | 7.5 | 4.5 | 5.1 | 6.1 | 1.2 |
| $TiO_2$ | 7.5 | 4.0 | 2.3 | 6.1 | 8.0 |
| $ZrO_2$ | 5.5 | 4.1 | 8.3 | 6.1 | 4.0 |
| $Nb_2O_5$ | 11.5 | 6.4 | 11.0 | 2.8 | 5.3 |
| $Y_2O_3$ | 3.0 | 0.0 | 2.5 | 2.0 | 5.0 |
| $Gd_2O_3$ | 10.0 | 1.3 | 9.9 | 8.5 | 13.0 |
| $Hf_2O$ | 0.1 | 0.0 | 0.0 | 0.0 | 0.0 |
| Total | 100.0 | 100.0 | 100.0 | 100.0 | 100.0 |
| $n_d$ | 1.96 | 1.89 | 1.95 | 1.93 | 1.97 |
| $\upsilon_d$ | 29 | 39 | 34 | 37 | 34 |
| Density | 5.11 | 4.87 | 5.33 | 5.24 | 5.45 |
| Tg | 758 | 737 | 736 | 807 | 861 |

TABLE 3

Examples 11 to 16

| | Ex. 11 | Ex. 12 | Ex. 13 | Ex. 14 | Ex. 15 | Ex. 16 |
|---|---|---|---|---|---|---|
| $La_2O_3$ | 51.3 | 52.0 | 53.5 | 58.6 | 53.9 | 53.5 |
| $SiO_2$ | 11.5 | 10.2 | 5.5 | 9.3 | 17.8 | 5.5 |
| $B_2O_3$ | 5.6 | 5.0 | 4.5 | 6.7 | 7.9 | 4.5 |
| $Ta_2O_5$ | 8.0 | 2.0 | 5.1 | 5.2 | 4.5 | 0.2 |
| $TiO_2$ | 6.1 | 3.4 | 8.0 | 0.2 | 4.0 | 8.0 |
| $ZrO_2$ | 7.0 | 6.0 | 0.1 | 7.2 | 4.1 | 4.0 |
| $Nb_2O_5$ | 0.0 | 15.0 | 5.3 | 8.7 | 6.4 | 6.3 |
| $Y_2O_3$ | 2.0 | 1.0 | 5.0 | 0.4 | 0.1 | 5.0 |
| $Gd_2O_3$ | 8.5 | 5.4 | 13.0 | 3.5 | 1.3 | 13.0 |
| $Hf_2O$ | 0.0 | 0.0 | 0.0 | 0.2 | 0.0 | 0.0 |
| Total | 100.0 | 100.0 | 100.0 | 100.0 | 100.0 | 100.0 |
| $n_d$ | 1.92 | 1.96 | 1.96 | 1.94 | 1.89 | 1.97 |
| $\nu_d$ | 38 | 32 | 34 | 37 | 39 | 34 |
| Density | 5.29 | 5.15 | 5.59 | 5.25 | 4.91 | 5.42 |
| Tg | 817 | 718 | 888 | 728 | 741 | 854 |

The glasses of the invention preferably have a glass transition temperature $T_g$ of usually less than or equal to 750° C., can be processed readily and are very resistant to alkalis (good alkali resistance). The coefficients of expansion $\alpha_{20\text{-}300}$ and are less than $11\times10^{-6}$ per K. The internal transmission of the glasses at 410 nm and a specimen thickness of 10 mm is greater than or equal to 80%.

The glasses have a density in the range from 4.4 g/cm³ to 5.5 g/cm³ and are thus readily processable and at the same time sufficiently scratch resistant.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An optical glass comprising $La_2O_3$, $SiO_2$, $B_2O_3$, $TiO_2$ and $Ta_2O_5$ and in which a $B_2O_3/SiO_2$ ratio of the proportions by weight is less than 1 and comprising the following composition, in % by weight on an oxide basis:

| | |
|---|---|
| $La_2O_3$ | 40.0-60.0 |
| $SiO_2$ | 5.0-18.0 |
| $B_2O_3$ | 4.0-less than 10.0 |
| $TiO_2$ | 0.1-10.0 |
| $Ta_2O_5$ | 0.1-10.0 |
| $ZrO_2$ | 0-15.0 |
| $Nb_2O_5$ | 0-15.0 |
| $Y_2O_3$ | 0.1-5.0 |
| $Gd_2O_3$ | 0-15.0. |

2. The optical glass according to claim 1, wherein the composition comprises, in % by weight on an oxide basis:

| | |
|---|---|
| $La_2O_3$ | 42.0-54.0 |
| $SiO_2$ | 5.5-16.0 |
| $B_2O_3$ | 4.5-9.0 |
| $TiO_2$ | 2.0-less than 8.0 |
| $Ta_2O_5$ | 1.0-8.0 |
| $ZrO_2$ | 0.1-10.0 |
| $Nb_2O_5$ | 0.1-11.0 |
| $Y_2O_3$ | 0.1-3.0 |
| $Gd_2O_3$ | 0.1-10.0 |
| $HfO_2$ | 0.01-0.50 |
| $WO_3$ | 0-5.0. |

3. The optical glass according to according to claim 1, comprising a sum of the proportions in % by weight of $La_2O_3+Ta_2O_5+Gd_2O_3+Nb_2O_5+Y_2O_3+TiO_2$ of at least 50% by weight.

4. The optical glass according to according to claim 1, comprising a ratio of proportions of the components $(TiO_2+ZrO_2)/(Nb_2O_5+Gd_2O_3+Y_2O_3)$ from 0.4 to 1.0.

5. The optical glass according to according to claim 1, wherein the glass is free of one or more components selected from the group consisting of $WO_3$, $GeO_2$, $Li_2O$, $Na_2O$, $K_2O$, $Rb_2O$, $Cs_2O$, MgO, CaO, BaO, SrO, ZnO, PbO, F, $As_2O_3$, $Bi_2O_3$, colour-imparting components, optically active components, and combinations thereof.

6. The optical glass according to claim 1, wherein the glass has a refractive index from 1.90 to 2.05 and an Abbe number from 28 to 39.

7. The optical glass according to according to claim 1, wherein the glass has, at a specimen thickness of 10 mm, an internal transmission at a wavelength of 410 nm of at least 75%.

8. An optical element, comprising an optical glass which comprises $La_2O_3$, $SiO_2$, $B_2O_3$, $TiO_2$ and $Ta_2O_5$ and in which a $B_2O_3/SiO_2$ ratio of the proportions by weight is less than 1 and comprising the following composition in % by weight on an oxide basis:

| | |
|---|---|
| $La_2O_3$ | 40.0-60.0 |
| $SiO_2$ | 5.0-18.0 |
| $B_2O_3$ | 4.0-less than 10.0 |
| $TiO_2$ | 0.1-10.0 |
| $Ta_2O_5$ | 0.1-10.0 |
| $ZrO_2$ | 0-15.0 |
| $Nb_2O_5$ | 0-15.0 |
| $Y_2O_3$ | 0.1-5.0 |
| $Gd_2O_3$ | 0-15.0. | the optical element being selected from the group consisting of lenses, aspherical bodies, prisms, compact components, and preforms thereof.

* * * * *

UNITED STATES PATENT AND TRADEMARK OFFICE
CERTIFICATE OF CORRECTION

| | | |
|---|---|---|
| PATENT NO. | : 9,018,116 B2 | Page 1 of 1 |
| APPLICATION NO. | : 13/911580 | |
| DATED | : April 28, 2015 | |
| INVENTOR(S) | : Schreder et al. | |

It is certified that error appears in the above-identified patent and that said Letters Patent is hereby corrected as shown below:

Title Page

Under "Foreign Application Priority Data",

Item (30) - please insert: --DE 10 2012 209 531.4 Filed June 6, 2012--.

Signed and Sealed this
First Day of September, 2015

Michelle K. Lee
*Director of the United States Patent and Trademark Office*